No. 627,530. Patented June 27, 1899.
A. RAPS.
ELECTRICAL SPEED INDICATOR.
(Application filed Aug. 19, 1898.)
(No Model.)
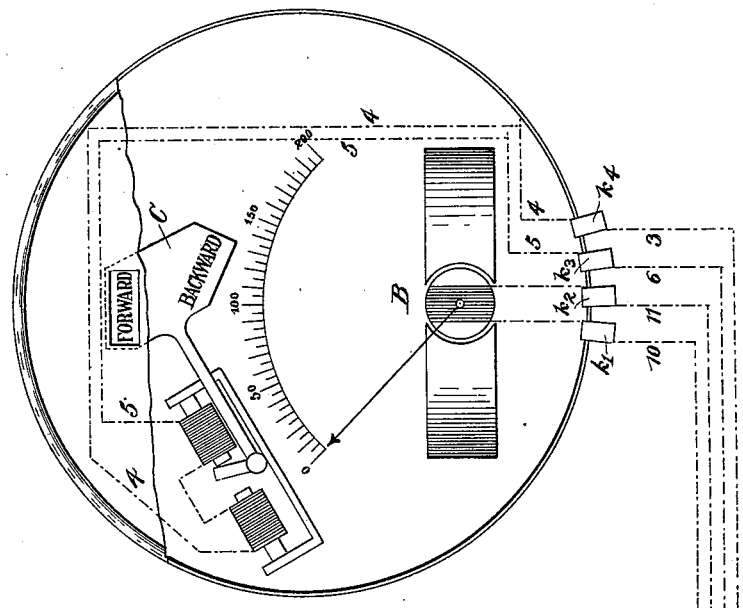
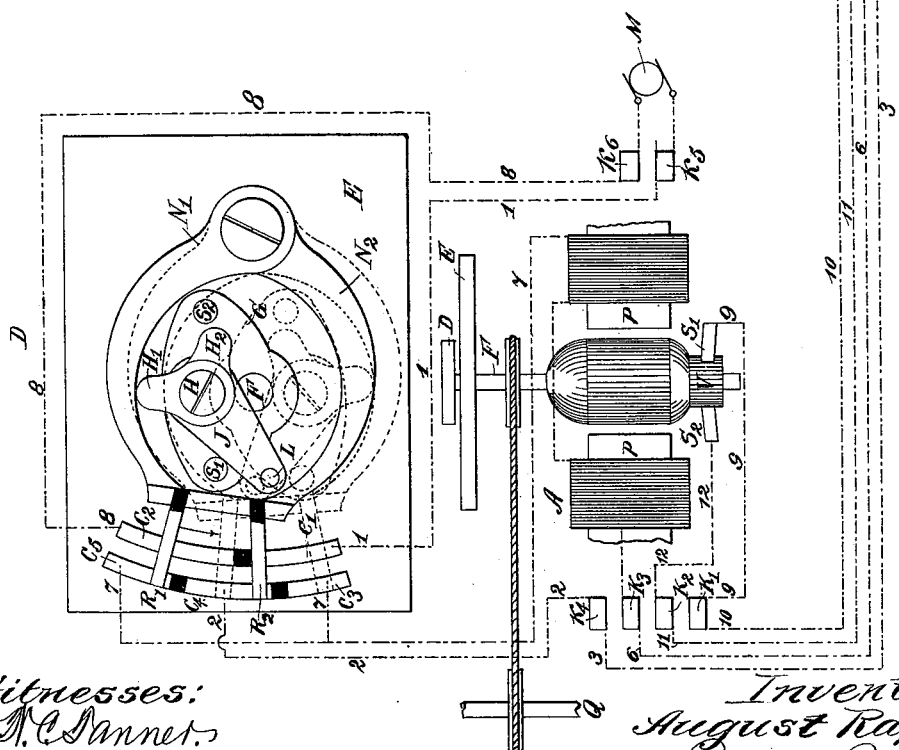
Witnesses:
Inventor,
August Raps,
By Barton & Brown
Attorneys.

UNITED STATES PATENT OFFICE.

AUGUST RAPS, OF BERLIN, GERMANY, ASSIGNOR TO THE SIEMENS & HALSKE ELECTRIC COMPANY OF AMERICA, OF CHICAGO, ILLINOIS.

ELECTRICAL SPEED-INDICATOR.

SPECIFICATION forming part of Letters Patent No. 627,530, dated June 27, 1899.

Application filed August 19, 1898. Serial No. 689,055. (No model.)

*To all whom it may concern:*

Be it known that I, AUGUST RAPS, a subject of the Emperor of Germany, residing at Berlin, Germany, have invented a certain new and useful Improvement in Electrical Speed-Indicators, (Case No. 154,) of which the following is a full, clear, concise, and exact description.

This invention relates to instruments the object of which is to indicate the speed or the number of revolutions executed in a given time by any rotating part of machinery in such a way that it can be observed at any required distance from the rotating part itself.

The invention consists in coupling with the rotating part the speed of which is to be indicated a dynamo-electric machine the electromotive force of which is proportional to the number of its revolutions and to provide at the place where the speed of the machinery is to be observed a voltmeter of any suitable type graduated accordingly.

In the accompanying drawing the arrangement forming the subject of this invention is diagrammatically illustrated.

Q is a rotating shaft or any other rotating part of machinery the speed of which is to be indicated.

A is a dynamo-electric machine of any suitable type, which is coupled by suitable means—in the drawing, for instance, by a rope running over a pair of sheaves—with the rotating shaft Q. V is the armature. P P are the field-magnets. $S'$ $S^2$ are the brushes, and F is the shaft of the said dynamo-electric machine A.

E is a fixed plate, the use of which will be explained hereinafter.

D is a commutating device fixed on the shaft F of the machine A and rotating with it.

The arrangement of E and D is drawn a second time on an enlarged scale, showing distinctly all the parts and connections.

G is a disk fixed on the shaft F of the machine A and rotating with it.

$s'$ and $s^2$ are two pins projecting from the surface of the disk G and intercepting the lever J, pivoted on the pin H, which is likewise fastened in the surface of the disk G.

$H'$ and $H^2$ are two cams rigidly connected with the lever J.

$N'$ and $N^2$ are two curved levers pivoted at one end and being placed in different planes in such a way that the lever $N'$ is in the same plane as and therefore can be controlled by the cam $H'$, and the lever $N^2$ is in the same plane with and therefore controlled by the cam $H^2$. The lever $N'$ carries at its extreme end a sliding contact-piece $R'$, and the lever $N^2$ correspondingly a sliding contact-piece $R^2$. These contact-pieces slide on fixed contact-pieces $c'$, $c^2$, $c^3$, $c^4$, and $c^5$.

M is a separate independent generator of electric current of any suitable kind.

1, 2, 3, 4, 5, 6, 7, 8, 9, 10, 11, and 12 are conductors.

$K'$, $K^2$, $K^3$, $K^4$, $K^5$ and $K^6$ and $k'$, $k^2$, $k^3$, and $k^4$ are binding-posts, making the connections between the different parts of the herein-described arrangement.

B is a voltmeter of any suitable type, the graduation of which is adapted to show revolutions per minute instead of showing volts.

C is an indicator operated by a pair of electromagnets so as to assume either the one or the other of two positions, and thus to expose to view either the word "Forward" or the word "Backward."

The operation of the herein-described arrangement is the following: It is well known that when the magnetic field of a dynamo-electric machine is constant and there is no armature reaction—i. e., when a negligible load only is placed upon the machine—the electromotive force of said machine is proportional to the speed of the armature's rotation. If, therefore, a dynamo-electric machine is coupled with any rotating part of machinery the speed of which is to be indicated at a distance—as, for instance, the propeller-shaft of a steamship—it is only necessary to arrange at the place where the speed of the shaft is to observed a voltmeter suitably graduated to indicate revolutions per minute instead of indicating volts and to connect such voltmeter with the terminals of the dynamo-electric machine in order to obtain the desired result. This rule, however, only holds good if the field of the said dynamo-electric machine is maintained constant. This can be done by providing it with permanent magnets; but I prefer to use electromagnets that are separately excited by an independent source of electrical current, all inequalities of excitation, reaction of the armature, &c., being avoided by overexciting the magnets, so as to maintain them in a fully-saturated state. For this purpose the machine M is employed. If the voltmeter were arranged in such a way as to have the zero-point in the center of the scale, it would be possible to distinguish by the direction of the deviation of the indicator whether the shaft Q is running forward or backward; but the instrument is rendered much more sensitive if the indicator traverses the double distance over the scale, and therefore I prefer to provide an arrangement for automatically reversing the exciting-current when the direction of revolution of the shaft Q is reversed. For this purpose the commutating device D is interposed between the terminals of the machine M and the field-magnets, and the indicator C is provided to show at the place of observation in what direction the shaft Q is revolving. The lever J is provided at its end with a soft leather button L, which causes a minute amount of friction between the shaft of the machine A, that carries the lever J, and the fixed plate E. Therefore when the direction of rotation of the dynamo-shaft is reversed the lever J will lag behind until the shaft F, and with it the disk G, has turned so far as to bring one of the pins $H'$ or $H^2$ into contact with the lever J, thus forcing it around in spite of the friction on the plate E. Thus for each sense of rotation the lever J will be brought into a different position, and consequently either the cam $H'$ or the cam $H^2$ will project, since these two cams are fastened on the lever J, and consequently either the lever $N'$ or the lever $N^2$ will be operated, thus causing the sliding contacts $R'$ and $R^2$ to take corresponding positions on the fixed contact-pieces $c'$, $c^2$, $c^3$, $c^4$, and $c^5$. In the drawing the cam $H'$ is assumed to be projecting, and the position of the levers $N'$ and $N^2$ and of the sliding contacts which would be caused by reversing the direction of rotation of the shaft Q is indicated by dotted lines. The current proceeds from the brush $S'$ through the line 9 to the binding-post $K'$, through the line 10 to the binding-post $k'$ of the receiver, and from thence to the voltmeter, and returns from the voltmeter to the binding-post $k^2$ of the receiver, passes through the line 11 to the binding-post $K^2$ of the transmitter, and thence through the line 12 to the brush $S^2$ of the dynamo A. The exciting-current proceeds from the positive brush of the generator M to the binding-post $K^5$ of the transmitter, passes along the line 1 to the fixed contact-piece $c'$, over the sliding contact-piece $R^2$ to the fixed contact-piece $c^4$, along the line 2 to the binding-post $K^4$ of the transmitter, along the line 3 to the binding-post $k^4$ of the receiver, along line 4 to the electromagnets of the indicator, back through line 5 to the binding-post $k^3$ of the receiver, along line 6 to the binding-post $K^3$ of the transmitter, through the field-magnets P P of the machine A, along the line 7 to the fixed contact-piece $c^5$, over the sliding contact-piece $R'$ to the fixed contact-piece $c^3$, along the line 8 to the binding-post $K^6$, and from thence to the negative brush of the generator M.

If the same connections are followed up, assuming the lever system $N'$ $N^2$ to be brought into the position shown by the dotted lines, it will be seen that the exciting-current is reversed in the field-magnets and in the indicator C, thus causing the word "Backward" to be exposed.

Having now particularly described and ascertained the nature of my invention and the manner in which the same is to be performed, I declare that what I claim is—

1. In a device of the class described the combination with a dynamo-electric machine connected with the measured shaft or part, of a speed-indicating device, electrically connected with the armature-circuit of said machine, a secondary source of electrical energy connected with and energizing the field-circuit of said dynamo-electric machine, and automatic means for reversing the flow of current in the field-circuit upon reversing the direction of rotation of the measured part, substantially as described.

2. In a speed and direction indicator, the combination with a dynamo-electric machine connected with the measured shaft or part, of a speed-indicating device, electrically connected with the armature-circuit of said machine, a secondary source of electrical energy connected with and energizing the field-circuit of said dynamo-electric machine, a direction-indicating device connected in circuit with the secondary source of current and automatic means for reversing the flow of current in the latter circuit upon reversing the direction of rotation of the measured part, substantially as described.

3. In a speed and direction indicator, the combination with a dynamo-electric machine connected with the measured shaft or part, of a speed-indicating device, electrically connected with the armature-circuit of said machine, a secondary source of electrical energy connected with and energizing the field-circuit of said dynamo-electric machine, a direction-indicating device connected in circuit with the secondary source of current and a reversing-switch operatively associated with the measured part and electrically connected in circuit with the secondary source of current adapted automatically to secure the reversal of the current in said circuit upon reversing the movement of the measured part, substantially as described.

4. A speed and direction indicator, consisting of a dynamo-electric machine connected to be driven by the indicated shaft or part, a separate source of electrical energy connected with the field-circuit of said dynamo-electric machine, an electrically-operated speed-indicating device connected with the armature-circuit of the dynamo-electric machine, an electrically-operated direction-indicating device connected with the field-circuit of the dynamo-electric machine, and automatic means for reversing the field-circuit when the direction of rotation of the indicated shaft or part is reversed, substantially as and for the purpose described.

5. A speed and direction indicator, consisting of a dynamo-electric machine connected to be driven by the indicated shaft or part, a separate source of electrical energy connected with the field-circuit of the dynamo-electric machine, an electrically-operated speed-indicating device connected with the armature-circuit of the dynamo-electric machine, a second indicating device coacting therewith connected in the field-circuit of the dynamo-electric machine adapted to indicate the direction of rotation of the indicated shaft or part, a disk or part mounted to rotate with the armature of the dynamo-electric machine, said disk being provided with projecting pins, a coacting lever pivoted upon said disk adapted to assume either of two positions, two cams associated with said lever, and an electrical switch adapted to be operated thereby, the same being connected with the field-circuit and adapted to reverse the current therein upon the reversal of the lever's position, substantially as described.

In witness whereof I hereunto subscribe my name this 23d day of July, A. D. 1898.

AUGUST RAPS.

Witnesses:
C. H. DAY,
HENRY HASPER.